Patented Oct. 15, 1935

2,017,648

UNITED STATES PATENT OFFICE 2,017,648

DEFEATHERING COMPOUND

Oscar T. Bloom and Levi Scott Paddock, Chicago, Ill., assignors to Industrial Patents Corporation, Chicago, Ill., a corporation of Delaware No Drawing. Application March 27, 1934, Serial No. 717,613

3 Claims. (Cl. 17—45)

This invention relates to an improved compound for use in dressing poultry.

One object of the invention is to provide an improved compound for use in removing dermal excrescences such as hair, down, feathers and the like from edible carcasses, particularly poultry.

Other objects of the invention will be apparent from the description and claims which follow.

One method commonly employed in dressing poultry involves the use of a waxy or adhesive compound in the nature of a depilatory which is applied to the bird in a melted condition, allowed to solidify by cooling and then removed, taking with it all epidermal excrescences such as feathers, down, pinfeathers and the like adherent to or embedded in the skin.

The composition of the present invention has been found particularly effective in practice and includes Burgundy pitch, Montan wax and paraffin.

A preferred formula is as follows:

| | Parts |
|---|---|
| Burgundy pitch | 15 |
| Montan wax | 5 |
| Paraffin | 10 |

The ingredients are melted, thoroughly mixed, and applied to the carcass, preferably after the bird has been scalded and the bulk of the feathers that can be removed hastily have been removed by hand.

After application, the defeathering compound is permitted to solidify by cooling and is then removed, taking with it epidermal excrescences such as feathers, down, pinfeathers and the like.

It will be understood that the proportions of the ingredients may be varied and other ingredients added without departing from the spirit of the invention as defined in the following claims.

We claim:

1. A defeathering compound including Burgundy pitch, Montan wax and paraffin.

2. A defeathering compound consisting of Burgundy pitch, Montan wax and paraffin.

3. A defeathering compound consisting of approximately fifty per cent Burgundy pitch, thirty-three and one-third per cent paraffin and sixteen and two-thirds per cent Montan wax.

OSCAR T. BLOOM.
LEVI SCOTT PADDOCK.